United States Patent

Seidel-Peschmann et al.

[11] Patent Number: 6,047,790
[45] Date of Patent: Apr. 11, 2000

[54] SOUND DAMPING DEVICE FOR OSCILLATORY COMPONENTS OF A MOTOR VEHICLE HYDRAULIC SYSTEM

[75] Inventors: Michael Seidel-Peschmann, Baden-Baden; Thomas Fritz, Gernsbach, both of Germany

[73] Assignee: Aeroquip Vickers International GmbH, Germany

[21] Appl. No.: 09/012,370

[22] Filed: Jan. 23, 1998

[30] Foreign Application Priority Data

Jan. 23, 1997 [DE] Germany .............. 197 02 172

[51] Int. Cl.⁷ .................................................. G10K 11/04
[52] U.S. Cl. ............................................ 181/200; 181/205
[58] Field of Search ............................. 181/200, 202, 181/204, 207, 208, 205; 138/26, 30

[56] References Cited

U.S. PATENT DOCUMENTS

| | | | |
|---|---|---|---|
| 3,134,611 | 5/1964 | Iversen | 138/26 |
| 3,687,224 | 8/1972 | Lundin | 181/207 |
| 4,395,982 | 8/1983 | Möller . | |
| 4,642,035 | 2/1987 | Nyquist . | |
| 4,835,972 | 6/1989 | Tugal et al. | 181/207 |
| 4,860,851 | 8/1989 | Krevor et al. | 181/207 |
| 5,180,298 | 1/1993 | DiRe | 181/208 |
| 5,631,451 | 5/1997 | Torisaka et al. . | |

FOREIGN PATENT DOCUMENTS

| | | |
|---|---|---|
| 0498261 | 8/1992 | European Pat. Off. . |
| 2751469 | 5/1979 | Germany . |
| 4141343 | 5/1993 | Germany . |
| 2216081 | 4/1989 | United Kingdom . |
| 8101479 | 5/1981 | WIPO . |

OTHER PUBLICATIONS

Patent Abstracts of Japan, Publication No. 09115747, Feb. 5, 1997.

*Primary Examiner*—Khanh Dang
*Attorney, Agent, or Firm*—Ostrolenk, Faber, Gerb & Soffen, LLP

[57] ABSTRACT

A device for damping the sound emission from oscillatory components of a fluid container of a hydraulic system, primarily in a motor vehicle. At least one vibration damping mass is coupled to the wall of a component subject to sound damping. The mass is adapted to the vibration to be damped by selection of material, shape, and/or position on the wall. For example, the mass is a rib fastened to the wall or a strip adhered to the wall. In an alternate embodiment, the container has an inner and an outer wall with a gap between them. The gap is either evacuated, filled with a sound absorbing material or ribs on the wall extend in the gap or inside the inner wall.

17 Claims, 3 Drawing Sheets

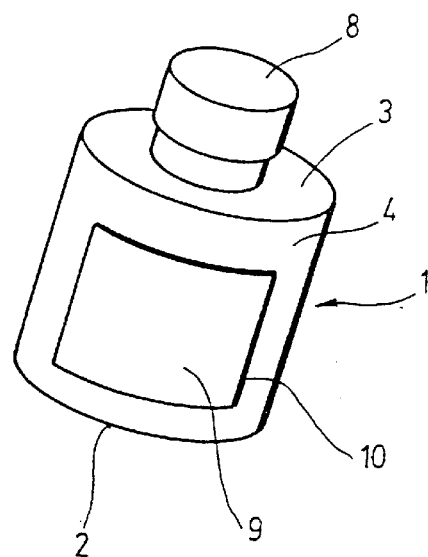
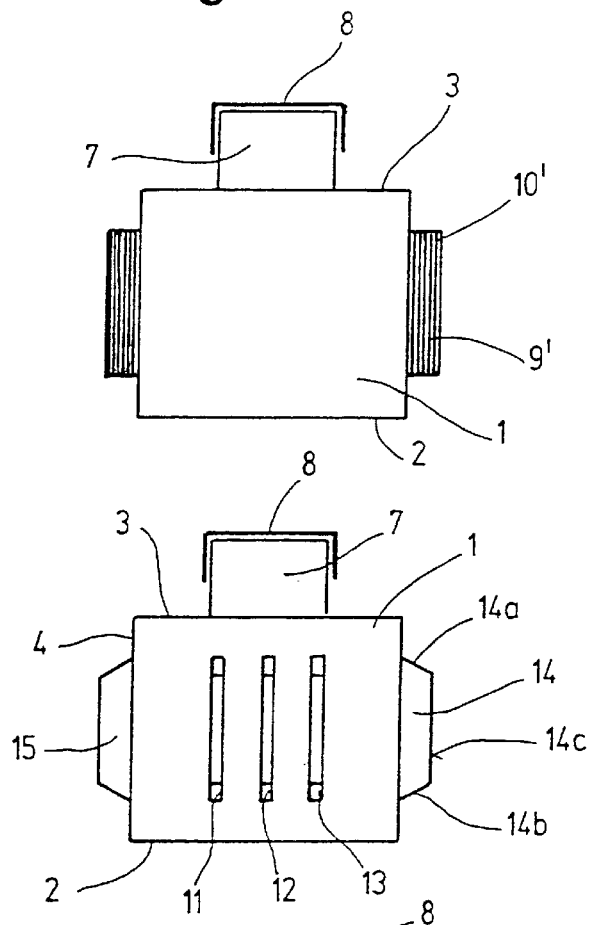
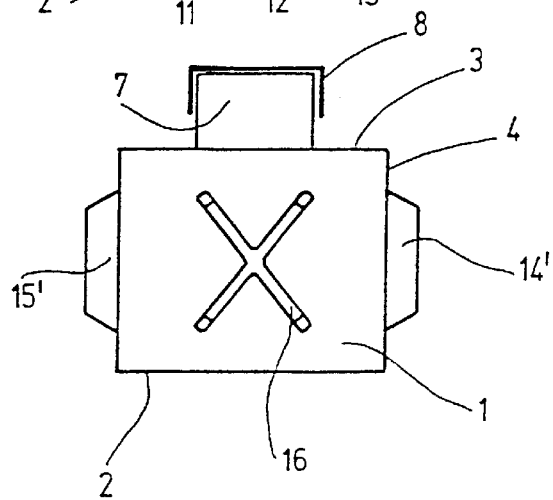

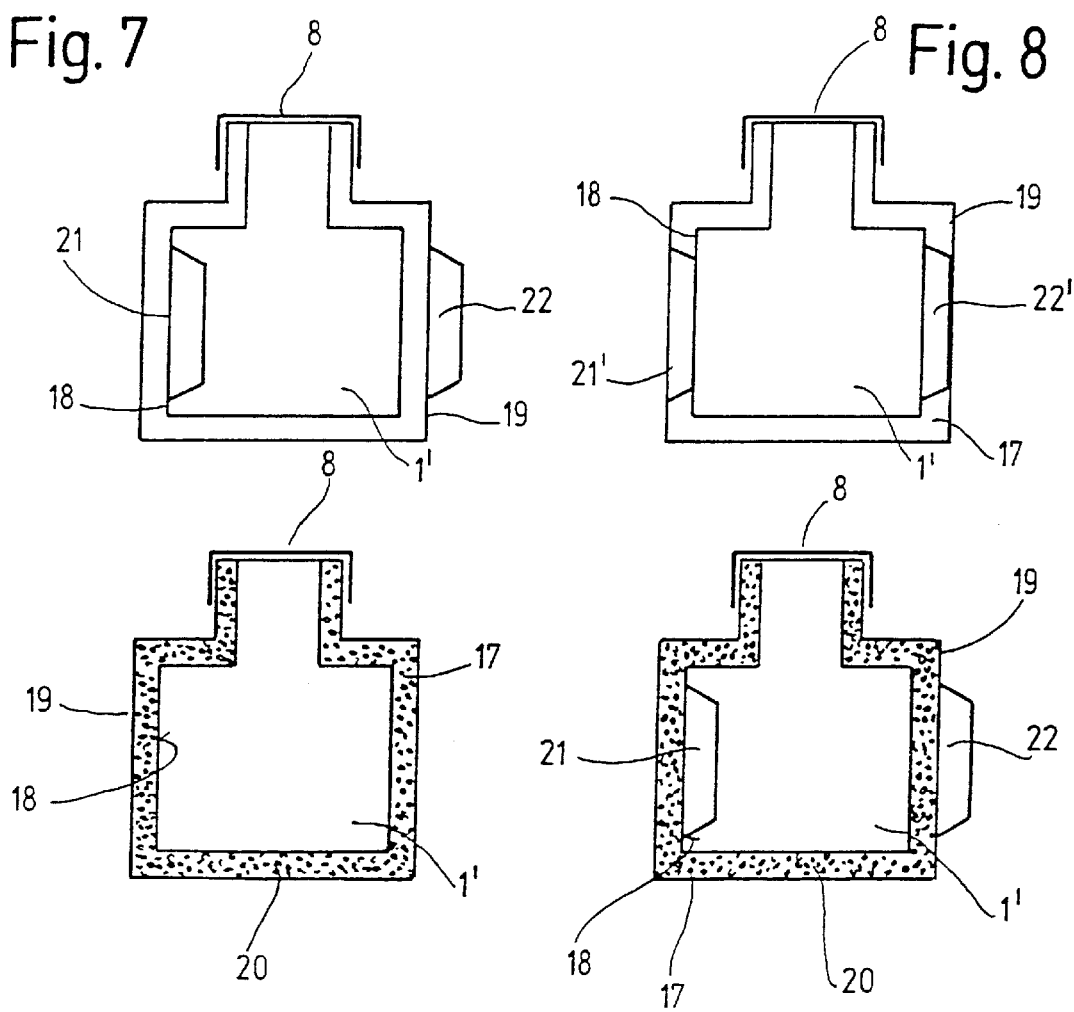

SOUND DAMPING DEVICE FOR OSCILLATORY COMPONENTS OF A MOTOR VEHICLE HYDRAULIC SYSTEM

BACKGROUND OF THE INVENTION

The present invention relates to a device for damping the sound emission from oscillatory components, in particular fluid containers, of the hydraulic system of motor vehicles.

The hydraulic system of a motor vehicle comprises, inter alia, fluid containers, including a supply container for the hydraulic fluid and fluid conducting connection lines. A hydraulic pump used for the delivery of the hydraulic fluid, can be connected either directly to a fluid container or indirectly via the connection lines. An electric motor may be used for the drive of the hydraulic pump. As an alternative, the hydraulic pump may be driven by the vehicle engine. In this case, the pump may be driven, for example, by a belt drive. Vibrations are introduced into the fluid conducting components of the hydraulic system by the hydraulic pump. These vibrations are emitted from the wall of the respective component, for example the fluid containers or the connection lines, as an annoying sound. As there has been low noise design of motor vehicles, there is also a demand to reduce the volume of the sound emitted from oscillatory components of a hydraulic system, as far as possible.

SUMMARY OF THE INVENTION

Accordingly, it is an object of the present invention to provide a sound damping device for oscillatory components of the hydraulic system of a motor vehicle, which device contributes in a positive manner to a low sound balance of a motor vehicle.

The invention concerns a device for damping the sound emitted from oscillatory components of a hydraulic system, primarily in a motor vehicle, and particularly the fluid container of the system. At least one vibration damping mass is coupled to the wall of the component that is subject to sound damping. The vibration damping mass is preferably adapted to at least one resonant frequency of the component that is subject to sound damping. The mass is adapted to the vibration to be damped by selection of its material, its shape, and/or its position on the wall. For example, the mass is a rib fastened to the wall or is a strip adhered to the wall.

In an alternate embodiment, the container has an inner and an outer wall with a gap between the walls. The gap is either evacuated, or is filled with a sound absorbing material, or ribs on one of the walls extend into the gap.

The damping measures for the oscillatory components of the system reduce the noise in the region of a motor vehicle hydraulic system, which will cause at least a significant reduction in the sound emitted from the components.

The vibration damping masses according to the invention, used for damping sound emission, may be coupled to the inside and/or the outside of the wall of the respective component subject to sound damping.

The respective vibration mass may be adapted to the vibration or vibrations to be damped in different ways. Preferably, it is adapted by selection of the size of its mass. As an alternative or in addition, it is adapted through selection of the shape of the vibration damping mass. Supplementary or alternative adaptation measures comprise selecting the position of the vibration damping mass on the wall of the component subject to sound damping, the material of the vibration damping mass preferably being the same as the material of the component subject to sound damping, and of the type of coupling or connection of the vibration damping mass to the wall of the component subject to sound damping. For example, the vibration damping mass may be connected to that wall in a hard or soft manner in terms of vibration, for example as a connection element of greater or lesser flexibility. The vibration damping measures mentioned may be used in any selected combination.

A preferred embodiment of the vibration damping mass comprises several ribs on the wall of the component. These are formed on the wall of the component that is subject to sound damping either with a mutual spacing of the ribs or some of the ribs may intersect.

A further preferred measure for reducing the sound emission comprises using a multiple wall, for example a two wall or double wall, design of the component subject to sound damping. The walls of the multiple wall construction are separated in a sound damping manner. The sound damping separation can be caused, for example, by filling a gap between the walls at least partially with vibration damping material. As an alternative, the gap may be evacuated. When the gap is filled with vibration damping material, the material is preferably adapted to the vibrations to be absorbed. At least one wall of the multiple wall component of the hydraulic system is provided with the vibration-damping mass according to the invention. To optimize the damping of the sound emission, however, preferably all of the walls are provided with the vibration damping mass and the vibration damping mass is preferably adapted to the vibration damping multiple wall construction. The device of the invention may be used for damping sound emission for all components of a motor vehicle hydraulic system, including containers, for example supply containers, and their connections or feed lines. The focus of the use of the device, however, is sound damping of large volume components, for example fluid supply containers.

Other features and advantages of the present invention will become apparent from the following description of the invention which refers to the accompanying drawings.

BRIEF DESCRIPTION OF THE DRAWINGS

FIG. 2 is a perspective view of the fluid container of FIG. 1, which is provided with a first embodiment of the vibration-damping mass according to the invention;

FIG. 3 shows the fluid container of FIG. 1 provided with a vibration damping mass which surrounds its circumference;

FIG. 4 shows the fluid container of FIG. 1 provided on its outer side with a large number of ribs for vibration damping;

FIG. 5 shows a modification of the embodiment of FIG. 4 with intersecting ribs for vibration damping;

FIG. 6 shows a cross-section of the fluid container of FIG. 1, in a sound damping multiple wall design;

FIG. 7 shows a cross-section of the fluid container of FIG. 6 with vibration damping ribs formed inside and outside the container;

FIG. 8 shows a cross-section of a variant of FIG. 7 with vibration damping ribs formed only on the inside of the container;

FIG. 9 shows a cross-section of the fluid container of FIG. 6 with the gap filled with vibration damping material; and FIG. 10 shows a cross-section of the double wall fluid container of FIG. 9 with vibration damping ribs as in FIG. 7.

DETAILED DESCRIPTION OF THE INVENTION

Figure 1:
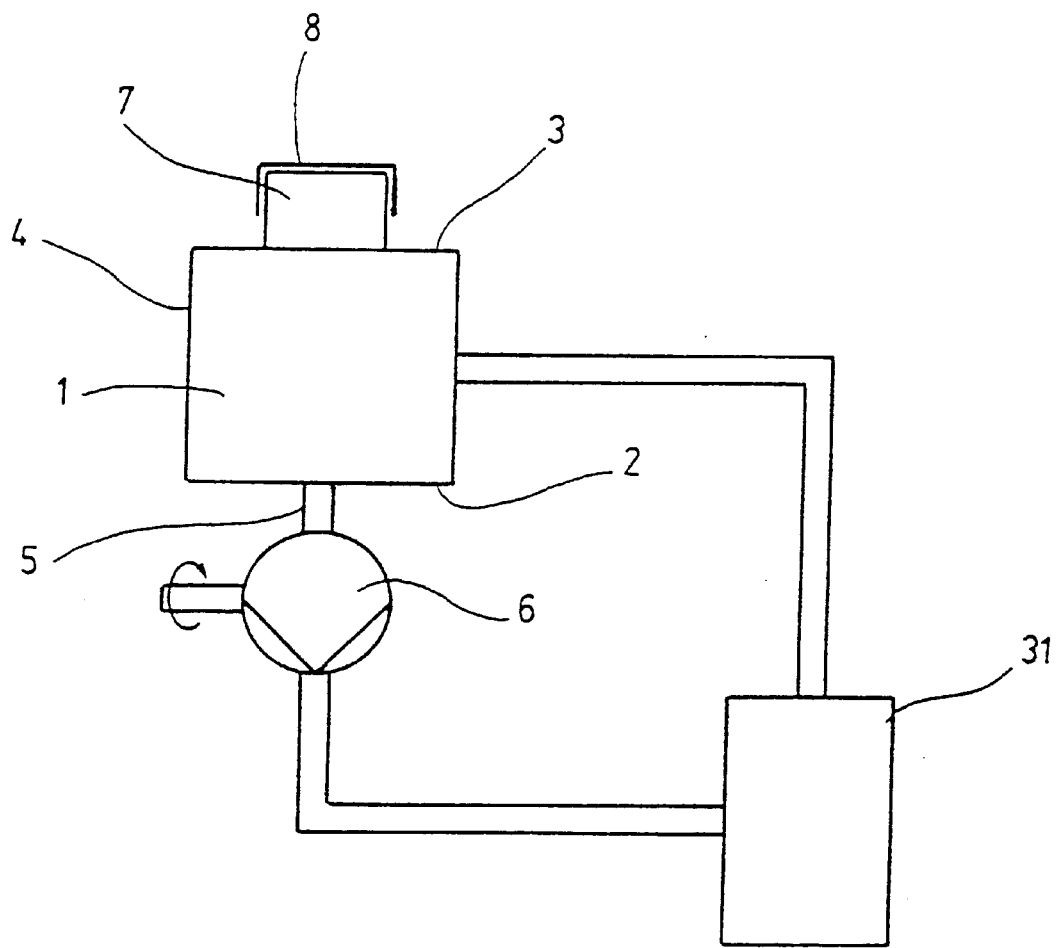
FIG. 1 is a diagrammatic view of a conventional hydraulic fluid container of a motor vehicle hydraulic system.

The fluid container 1 in FIG. 1 comprises a component of the hydraulic system of a motor vehicle. The container 1 has a bottom 2, a top wall 3 located opposite the bottom, and the bottom 2 and the top wall 3 are connected by a preferably circumferential, cylindrical or multiple surface wall 4.

A hydraulic fluid line 5 opens into the bottom 2. A hydraulic pump 6 delivers fluid stored in the container 1, for example, to a steering system 31. The fluid returns from the steering system 31 back into the container 1 through a return line 32. A filling nozzle 7 opens into the top wall 3 of the container 1 and is closed by a cap 8, preferably a screw on cap.

When the pump 6 is operated, for example by an electric motor, for delivery of fluid, vibrations are transmitted to the container 1 via the line 5 due to the operation of the pump, the electric motor or the vehicle engine and are emitted in the form of sound primarily by the container 1. This contributes to the general sound emission of a motor vehicle. Measures according to the invention for reducing that sound emission are illustrated in FIGS. 2 to 10.

FIG. 2 shows a vibration damping mass 9 in the form of a sheet metal or plastic strip attached to the cylindrical wall 4 of the container 1. The strip is fastened to the wall 4 by a damping mass 10 of predetermined hardness. The size and shape of the sheet metal strip 9, its thickness and/or its material structure, together with the material structure of the damping mass 10, are adapted to the vibration to be damped. That vibration is introduced by the operation of the pump 6 into the container 1, specifically both by means of structure borne sound via the line 5 and by means of vibrations of the fluid contained in the hydraulic system. In particular, the vibration damping mass 9, 10 is adapted to at least one resonance frequency of the container 1. A design solely using the mass 10 and without a sheet metal or plastic strip 9 is conceivable.

An alternative measure for vibration damping shown in FIG. 3 differs from that of FIG. 2 in use of a circumferential sheet metal strip 9' which is coupled to the wall 4 of the container 1 by a damping mass 10' which corresponds in placement and function to the mass 10.

FIG. 4 shows a further embodiment of the device according to the invention for vibration damping. Ribs 11 to 15 are formed on the circumferential wall 4 of the container 1, extend vertically with a mutual spacing, and are preferably integral with the wall and are made of the same material. The thickness, length, shape and mass and the mutual distance between the ribs defines the adaptation of the vibration damping ribs to the vibrations introduced by the pump 6 into the internal container 1 during operation.

As shown in FIG. 4, the ribs 11, 12, 13 may be combined to form groups of several free standing ribs with identical spacing, whereas the ribs 14 and 15, likewise illustrated, belong to other groups of ribs. As a particular feature, ribs 11 to 15 include rib ends 14a and 14b that slope down and their straight top or outer edges 14c run parallel to the longitudinal axis of the container 1. The ribs cover a portion of the wall 4.

FIG. 5 shows a further alternative arrangement of vibration damping ribs, in which ribs 14' and 15' are designed and arranged in the same way as the ribs 14 and 15 in FIG. 4. At least one rib structure, and preferably two rib structures located opposite one another, are arranged in the form of a cross 16 on the outer circumference 4 of the container 1. The ends of the cross-shaped or X-shaped rib arrangement likewise has flanks that slope down.

Further preferred embodiments of the damping measure of the invention are shown in FIGS. 6 to 10. A container 1' is formed with a double wall. Its general construction otherwise corresponds to the container of FIG. 1. However, an internal housing 18 is formed within an outer housing 19 of the same shape, but with smaller surface dimensions for forming a gap 17 between the walls. To separate the internal housing 18, which holds hydraulic fluid, from the outer housing 19, the gap 17 is evacuated. Alternative wall separation measures are shown in FIGS. 9 and 10, in which the gap 17 is filled with vibration damping material 20. The filling 20 as well as the dimension of the gap 17 are adapted to the vibrations introduced into the container 1' which are to be damped.

In the embodiments of FIGS. 7 and 10, additional vibration damping ribs 21 and 22 are coupled or connected preferably integrally to the internal housing 18 and to the outer housing 19. However, in the embodiment of FIG. 7, the gap 17 between the internal housing 18 and the outer housing 19 is evacuated.

FIG. 8 shows a modification of the embodiment of FIG. 7, in which the rib 22, coupled as rib 22' to the outer side of the internal housing 18, is provided in the gap 17. Likewise, the rib 21' provided in the gap 17 is fixedly connected to the inner side of the outer housing 19. The ribs 21' and 22' preferably have a spacing from the one of the internal housing 17 or the outer housing 18 with which it is not coupled or integrated. However, the ribs 21' and 22' may also be connected to the internal housing or outer housing as well, i.e. they may be connected to both housings.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A device for damping sound emissions from a wall of an oscillatory component of a hydraulic system, the sound being emitted by the wall as the result of vibration introduced to the oscillatory component by a pump of the hydraulic system, the device comprising at least one vibration damping mass coupled to a portion of the wall of the oscillatory component, the mass being adapted to the vibration of the component wall to be damped.

2. The device of claim 1, wherein the mass is adapted to at least one resonant frequency of the oscillatory component to be damped by at least one of material, shape, size dimensions, weight, and location of the mass coupled to the portion of the wall of the component.

3. The device of claim 2, wherein the component wall has a surface and the mass is coupled to the surface of the component wall.

4. The device of claim 1, wherein the oscillatory component subject to sound damping is a supply container for hydraulic liquid.

5. The device of claim 1, wherein the vibration damping mass is coupled to at least one of the inside and the outside of the wall of the component.

6. The device of claim 1, wherein a respective one of the vibration damping masses is coupled to each of the inside of and to the outside of the wall of the component.

7. The device of claim 1, wherein the vibration damping mass is comprised of the same material as the wall of the component.

8. The device of claim 7, wherein the vibration damping mass is integral with the wall of the hydraulic fluid storage component.

9. The device of claim 1, wherein the vibration damping mass is adapted to the vibration to be damped through the type of connection by which the component is coupled to the wall of the component.

10. The device of claim 1, wherein the vibration damping mass is in the form of a plurality of free-standing ribs extending along the wall of the component.

11. The device of claim 10, wherein the plurality of the ribs are formed with mutual spacing on the wall of the component.

12. The device of claim 10, wherein some of the ribs are oriented to intersect on the wall of the component.

13. A device for damping sound emissions from an oscillatory component of a hydraulic system, the component having an inner wall and an outer wall around the inner wall, the walls being shaped and supported as to define a gap between the walls, for effecting sound damping, the device further comprising a vibration damping mass coupled to a portion of one of the inner and outer walls.

14. The device of claim 13, wherein the component subject to sound damping is a supply container for hydraulic liquid.

15. The device of claim 13, wherein the gap is at least partially filled with vibration damping material.

16. The device of claim 13, wherein the mass projects into the gap between the walls.

17. A method of damping sounds in a hydraulic system, the hydraulic system comprising an oscillatory component, a pump connected to the oscillatory component introducing vibration into the oscillatory component, the introduced vibration being emitted as a sound from the oscillatory component, the method comprising the steps of:

damping the emitted sound by coupling to the oscillatory component at least one vibration damping mass, the properties and positioning of the mass being selected based on the vibration of the oscillatory component to be damped.

* * * * *